United States Patent
Chu et al.

(10) Patent No.: US 7,997,767 B2
(45) Date of Patent: Aug. 16, 2011

(54) ANTI-ICING OUTDOOR LAMP

(75) Inventors: Yuan-Fa Chu, Miao-Li Hsien (TW); Wen-Jang Jiang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 216 days.

(21) Appl. No.: 12/166,727

(22) Filed: Jul. 2, 2008

(65) Prior Publication Data

US 2009/0034231 A1 Feb. 5, 2009

(30) Foreign Application Priority Data

Aug. 1, 2007 (CN) .......................... 200710201231

(51) Int. Cl.
*F21V 29/00* (2006.01)
(52) U.S. Cl. .................. 362/294; 362/373; 362/336
(58) Field of Classification Search .................. 362/244, 362/260, 294, 336, 339, 373, 800, 802
See application file for complete search history.

(56) References Cited

U.S. PATENT DOCUMENTS

| | | | | |
|---|---|---|---|---|
| 4,729,076 A | * | 3/1988 | Masami et al. | 362/235 |
| 5,515,253 A | * | 5/1996 | Sjobom | 362/244 |
| 6,158,502 A | * | 12/2000 | Thomas | 165/104.26 |
| 6,352,356 B1 | * | 3/2002 | Noll | 362/260 |
| 7,314,291 B2 | * | 1/2008 | Tain et al. | 362/294 |
| 7,440,025 B2 | * | 10/2008 | Cheng | 348/373 |
| 7,607,802 B2 | * | 10/2009 | Kang et al. | 362/294 |
| 7,637,633 B2 | * | 12/2009 | Wong | 362/294 |
| 2004/0120156 A1 | | 6/2004 | Ryan | |
| 2008/0265777 A1 | * | 10/2008 | Ritz et al. | 313/639 |

FOREIGN PATENT DOCUMENTS

| | | | |
|---|---|---|---|
| CN | 2935698 Y | * | 8/2007 |
| JP | 2002-150807 A | | 5/2002 |
| JP | 2002150807 A | * | 5/2002 |
| JP | 2002166778 A | * | 6/2002 |
| JP | 2005108631 A | * | 4/2005 |
| JP | 2006-294263 A | | 10/2006 |
| KR | 2007006230 A | * | 1/2007 |
| TW | 308398 | | 3/2006 |
| TW | 200718339 | | 5/2006 |

* cited by examiner

*Primary Examiner* — Hargobind S Sawhney
(74) *Attorney, Agent, or Firm* — Andrew C. Cheng

(57) ABSTRACT

An exemplary outdoor lamp includes a light source, a light-pervious cover, and a heating element. The light source is configured for emitting light. The light-pervious cover is for transmission of the light emitted from the light source therethrough. The heating element is in thermal contact with the light-pervious cover and is configured for heating the light-pervious cover.

8 Claims, 5 Drawing Sheets

ANTI-ICING OUTDOOR LAMP

BACKGROUND

1. Technical Field

The present invention relates to an outdoor lamp, particularly, to anti-icing outdoor lamps.

2. Description of Related Art

Nowadays, outdoor lamps are widely used, for example, in roads, in stadiums, and so on. Outdoor lamps are convenient for people to perform all kinds of outdoor activities, such as driving, playing football, in a dark environment.

However, in cold weather (e.g., during snow conditions), ice may be formed on light-pervious covers of the outdoor lamps and may block a large portion of the light emitted therefrom, resulting in a brightness reduction.

Therefore, a new outdoor lamp is desired to overcome the above mentioned problems.

SUMMARY

An exemplary outdoor lamp includes a light source, a light-pervious cover, and a heating element. The light source is configured for emitting light. The light-pervious cover is for transmission of the light emitted from the light source therethrough. The heating element is in thermal contact with the light-pervious cover and is configured for heating the light-pervious cover.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
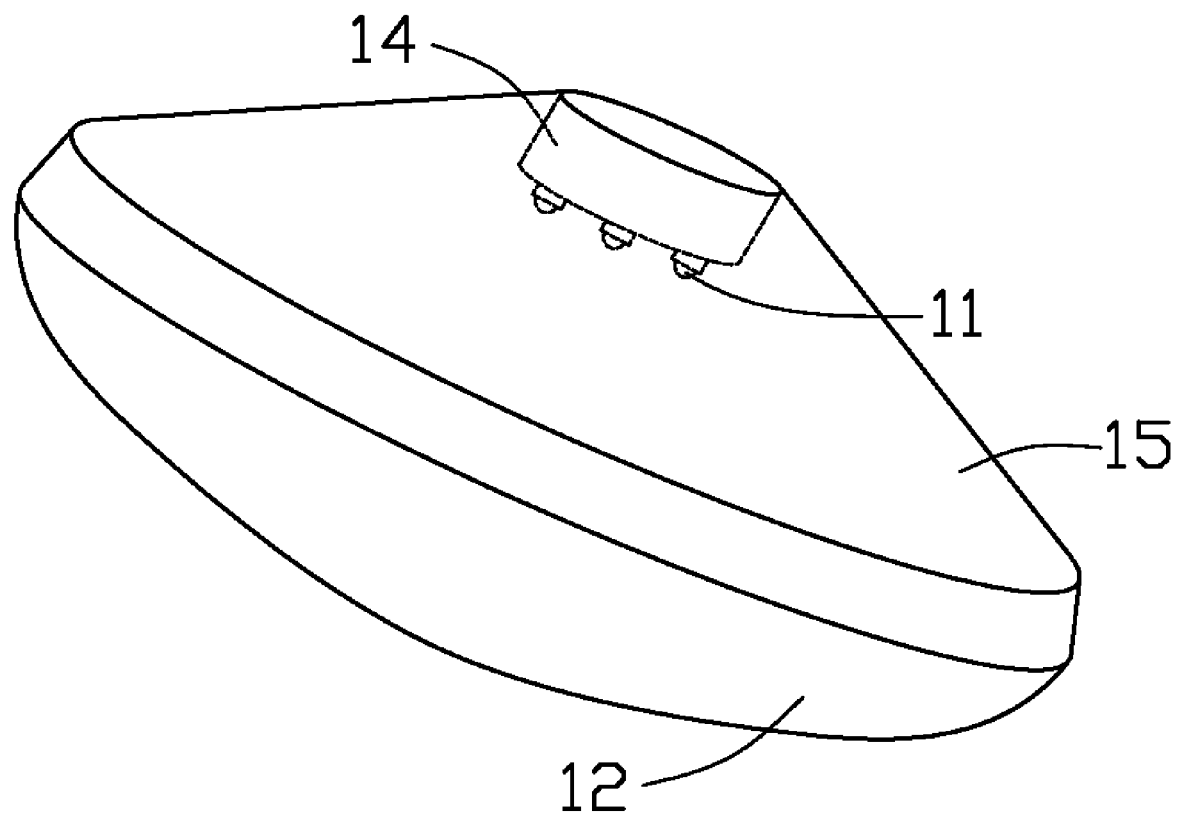
FIG. 1 is a schematic, perspective view of an outdoor lamp of a first embodiment.
Figure 2:
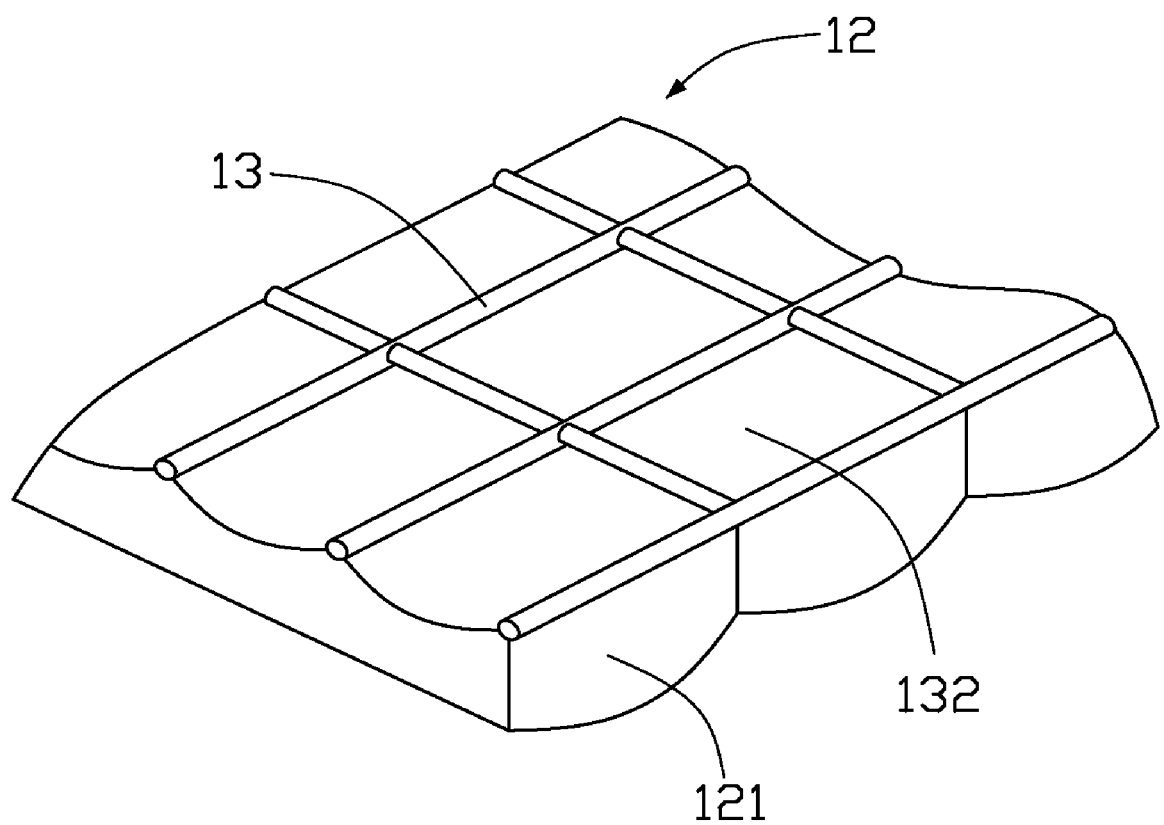
FIG. 2 is a schematic, isometric view of a light-pervious cover with heating elements arranged thereon of the outdoor lamp of FIG. 1.

Referring to FIGS. 1 and 2, an outdoor lamp 10 of a first embodiment is shown. The outdoor lamp 10 includes a light source 11, a light-pervious cover 12, a plurality of heating elements 13, and a circuit board 14.

The light source 11 can be at least one light emitting diode (LED) or at least one incandescent lamp, and etc. In the present embodiment, the light source 11 is an LED array. The light source 11 is electrically mounted on the circuit board 14.

The light-pervious cover 12 is arranged on a first side of the light source 11. The light-pervious cover 12 is configured for optically adjusting (e.g., diverging or converging) a direction of the light emitted from the light source 11, thus adjusting an illumination scope of the light source 11. In the present embodiment, the light-pervious cover 12 is a lens array comprising a plurality of lenses 121 distributed in rows and columns. In operation, light emitted from the light source 11 is optically adjusted by the light-pervious cover 12, and then illuminates objects, such as roads. The outdoor lamp as claimed in claim 7, wherein the heating element has a grid structure with a plurality of meshes, the lenses being aligned with the respective meshes.

The heating elements 13 are in thermal contact with the light-pervious cover 12, and are configured for heating the light-pervious cover 12, thus preventing the light-pervious cover 12 from freezing. The heating element 13 has a grid structure with a plurality of meshes 132. Each lens 121 aligns with a corresponding mesh 132 of the heating element 13, so that the heating elements 13 do not interfere with the light emitting through the light-pervious cover 12. The heating elements 13 can be connected to the light-pervious cover 12 by a metal mesh, a metal pipe, and so on. In the present embodiment, the heating elements 13 are in direct physical contact with the light-pervious cover 12. The heating elements 13 are electro-thermal heating element and electrically connected to a power supply (not shown). The heating elements 13 are first heated and then heat the light-pervious cover 12. The heating elements 13 can be, such as, heating tapes, heating coil, and etc.

The lampshade 15 is arranged on a second side opposite to the first side of the light source 11. The lampshade 15 matches with the lamp shade 12, cooperatively enclosing the light source 11, the circuit board 14, and the heating elements 13 therebetween. The lampshade 15 protects the light source 11, the circuit board 14, and the heating elements 13 from rain and wind.

The above outdoor lamp 10 can be supported by a bracket (not shown) and used in roads, stadiums, and so on. The outdoor lamp 10 can prevent ice accumulating thereon or eliminate accumulated ice thereon. When the outdoor lamp 10 is used in cold weather, electrical energy is supplied to the heating elements 13 by the power supply (not shown) so as to increase the temperature of the heating elements 13. The heating elements 13 heat the light-pervious cover 12, and accordingly prevent the light-pervious cover 12 from freezing. Hence, the heating elements 13 can prevent the light emitted from the light source 11 from being blocked by the ice. As a result, the brightness of the outdoor lamp 10 during cold weather is maintained. Thus, it is safe for people to conduct outdoor activities (e.g., driving and skating) using such an outdoor lamp 10.

Figure 3:
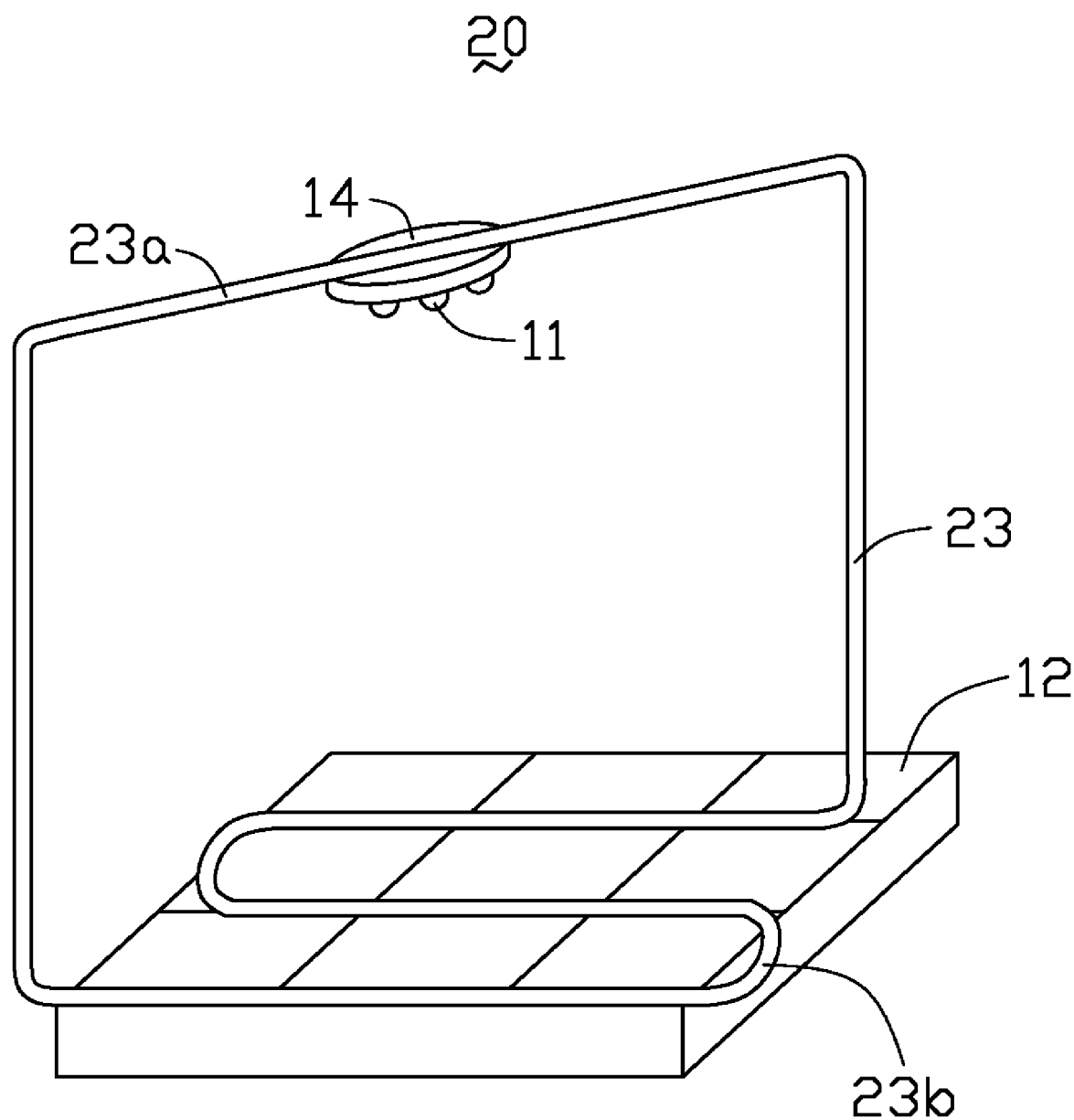
FIG. 3 is a schematic, isometric view of an outdoor lamp of a second embodiment.
Figure 4:
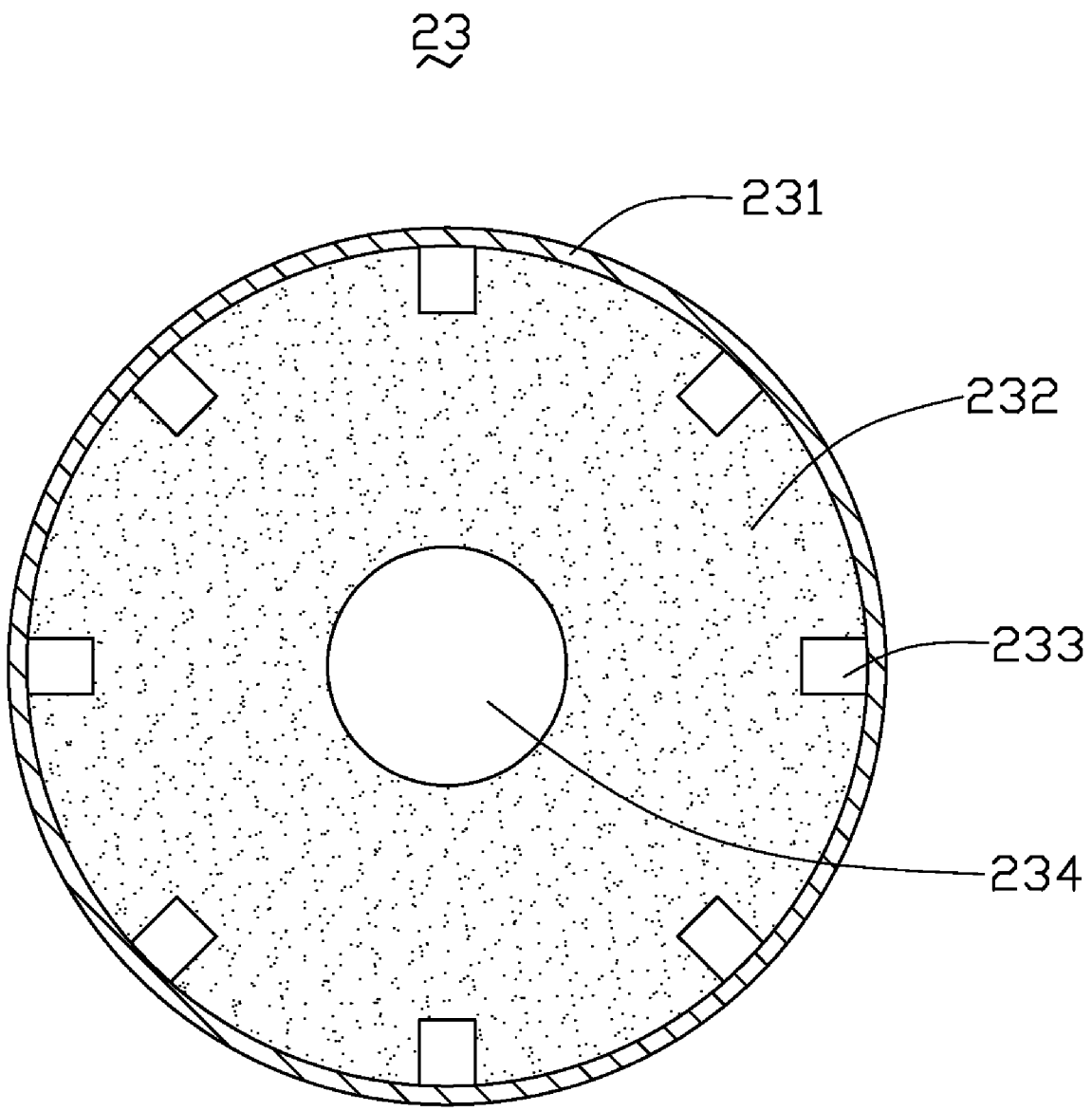
FIG. 4 is a schematic, cross-sectional view of a heat pipe loop in the outdoor lamp of FIG. 3.

Referring to FIG. 3, an outdoor lamp 20 of a second embodiment is shown. The outdoor lamp 20 is similar to the outdoor lamp 10, except that the heating element is a heat pipe loop 23. The heat pipe loop 23 includes an evaporation section 23a in thermal contact with the light source 11, and a condensation section 23b in thermal contact with the light-pervious cover 12.

The heat pipe loop 23 includes a loop tube 231, a wick 232 received in the tube 231, a tunnel 234 defined in the wick 232, and a working fluid (not shown) filled in the tunnel 234. The tube 231 and the wick 232 cooperatively define a plurality of vapor channels 233 therebetween.

In operation, the working fluid is heated at the evaporation section 23a by the heat generated by the light source 11, and is then evaporated into vapor (evaporation). When the vapor arrives at the condensation section 23b, the vapor heats the light-pervious cover 12 and is changed into liquid (condensation). The liquid flows to the tunnel 234 through the wick 232 because of the capillary action and then flows back to the evaporation section 23*a*. At the evaporation section 23*a*, the liquid is heated and then evaporated into vapor again. By repeating the above working cycle, the heat generated by the light source 11 can be used to heat the light-pervious cover 12, thus preventing the light-pervious cover 12 from freezing. Furthermore, the efficiency of the heat dissipation of the light source 11 is improved. As a result, the outdoor lamp 30 is more durable.

Figure 5:
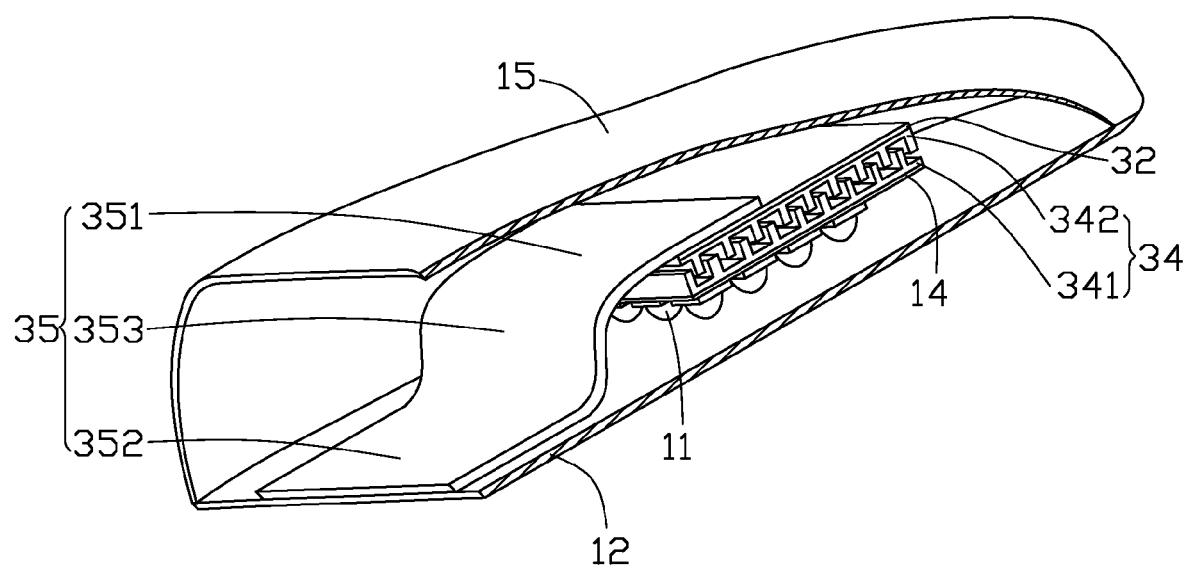
FIG. 5 is a schematic, perspective view of an outdoor lamp of a third embodiment.

Referring to FIG. 5, an outdoor lamp 30 of a third embodiment is shown. The outdoor lamp 30 is similar to the outdoor lamp 10, except that the heating element includes a thermoelectric cooler 34 and a heat conducting element 35. The thermoelectric cooler 34 includes a cold end 341 and an opposite hot end 342. The cold end 341 is in thermal contact with the light source 11 using the circuit board 14. An outer surface of the thermoelectric cooler 34 is generally made of an insulative material that has low heat conductivity. Thus, the outer surface of the hot end 342 can be covered by a metal layer 32 with high heat conductivity. The metal layer 32 is configured for improving heat conduction efficiency.

The heat conducting element 35 includes a first end 351, an opposite second end 352, and a bending portion 353. The bending portion 353 is between the first end 351 and the second ends 352, and connects the first end 351 and the second ends 352. The first end 351 is in thermal contact with the metal layer 32, and the second end 352 is in thermal contact with the light-pervious cover 12. The heat from the hot end 342 of the thermoelectric cooler 34 can be transferred to the light-pervious cover 12 by the heat conducting element 35. Thus, the position of light-pervious cover 12 is not restrained by the positions of the light source 11 and the thermoelectric cooler 34. The contact area between the heat conducting element 35 and the metal layer 22 should be as large as possible to enhance the heat conduction efficiency. Similarly, the contact area between the heat conducting element 35 and the light-pervious cover 12 should be as large as possible. The heat conducting element 35 can be made of flexible or rigid material with high heat conductivity. The heat conducting element 35 can have a sheet-like shape or a pipe-like shape (e.g., a heat pipe).

In operation, the heat generated by the light source 11 is absorbed by the cold end 341 of the thermoelectric cooler 34, and then forcedly transferred to the hot end 342 of the thermoelectric cooler 34. Subsequently, the heat is then transmitted to the light-pervious cover 12 from the hot end 342. Accordingly, the heat generated by the light source 11 is used to heat the light-pervious cover 12, thus preventing the light-pervious cover 12 from freezing. Furthermore, the efficiency of the heat dissipation of the light source 11 can be improved. As a result, the outdoor lamp 30 is more durable.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An outdoor lamp comprising:
   a light source for emitting light;
   a light-pervious cover for transmission of the light emitted from the light source therethrough, the light-pervious cover comprising a lens array, the lens array comprising a plurality of lenses arranged in rows and columns; and
   a heating element in thermal contact with the light-pervious cover, the heating element being configured for heating the light-pervious cover, the heating element having a grid structure with a plurality of meshes, the lens being aligned with the respective meshes.

2. The outdoor lamp as claimed in claim 1, wherein the heating element includes an electro-thermal heating element.

3. The outdoor lamp as claimed in claim 1, wherein the heating element includes a heating tape or a heating coil.

4. The outdoor lamp as claimed in claim 1, wherein the light source includes at least one LED.

5. The outdoor lamp as claimed in claim 1, wherein the outdoor lamp further comprises a lampshade on an opposite second side of the light source, the lampshade and the light-pervious cover cooperatively enclosing the light source and the heating element therebetween.

6. The outdoor lamp as claimed in claim 1, further comprising a circuit board, the light source electrically mounted on the circuit board.

7. An outdoor lamp comprising:
   a lampshade;
   a light-pervious cover;
   a light source disposed between the lamp shade and the light-pervious cover, for emitting light toward the light-pervious cover, the light-pervious cover comprising a lens array, the lens array comprising a plurality of lenses arranged in rows and columns; and
   a heating element in thermal contact with the light-pervious cover for heating the light-pervious cover, the heating element comprising a grid structure with a plurality of meshes, the lenses being respectively aligned with the meshes.

8. The outdoor lamp as claimed in claim 7, wherein the heating element includes an electro-thermal heating element.

* * * * *